United States Patent [19]

Gisler et al.

[11] Patent Number: 4,798,122

[45] Date of Patent: Jan. 17, 1989

[54] WIND INSTRUMENT AND PROCESS OF MAKING SAME

[75] Inventors: Barbara Gisler, Mauerbach; Werner Tomasi, Vienna, both of Austria

[73] Assignee: Walter Wretschitsch, Vienna, Austria; a part interest

[21] Appl. No.: 893,547

[22] Filed: Oct. 3, 1986

[30] Foreign Application Priority Data

Dec. 4, 1984 [AT] Austria ................................ 3850/84
Dec. 4, 1984 [AT] Austria ................................ 3849/84

[51] Int. Cl.[4] ........................ B29C 43/18; G10D 9/04

[52] U.S. Cl. .................................... 84/385 P; 84/330; 84/380 R; 84/385 R; 264/22; 264/242; 264/250; 264/268; 264/275; 264/278; 425/DIG. 47

[58] Field of Search ................. 264/22, 242, 250, 257, 264/259, 268, 275, 278; 425/DIG. 47; 84/60, 61, 62, 63, 64, 330, 380 R, 385 R, 385 P

[56] References Cited

U.S. PATENT DOCUMENTS

| | | | |
|---|---|---|---|
| 2,204,766 | 6/1940 | Michalek | 84/385 P |
| 3,247,749 | 4/1966 | Gullotta | 84/385 R |
| 3,295,403 | 1/1967 | Kindlesparker | 84/385 P |
| 3,688,633 | 9/1972 | Nagao | 84/380 R |
| 4,088,730 | 5/1978 | Wilde | 264/268 |
| 4,114,500 | 9/1978 | Norbeck | 84/385 P |
| 4,158,979 | 6/1979 | Suzuki | 84/385 P |
| 4,312,824 | 1/1982 | Mori et al. | 264/268 X |
| 4,508,004 | 4/1985 | Pages | 84/385 P |

FOREIGN PATENT DOCUMENTS

| | | | |
|---|---|---|---|
| 1937806 | 2/1971 | Fed. Rep. of Germany | 84/385 P |
| 919173 | 2/1947 | France | 84/385 P |
| 717902 | 11/1954 | United Kingdom | 84/385 P |

*Primary Examiner*—Jeffery Thurlow
*Assistant Examiner*—Leo B. Tentoni
*Attorney, Agent, or Firm*—Wegner & Bretschneider

[57] ABSTRACT

Process for the manufacture of a wind instrument which, for varying the pitch, is provided with keys (6), which in turn are provided with compliant seal inlays (7), and wind instrument constructed in this manner, e.g., transverse flute, saxophone, clarinet, oboe, bassoon, piccolo. The seal inlays of the keys of the wind instrument, which are applied against the rim (5) of the holes (3) determining the pitch, are fitted to the rim of the holes to be closed by means of a nonrigid elastic plastic which is solidified in situ. During the molding, the keys are braced in the position corresponding to their closed position in the finished instrument by a brace which is removed after the molding or by a flexible covering which remains after the molding on the nonrigid elastic solidified plastic.

27 Claims, 4 Drawing Sheets

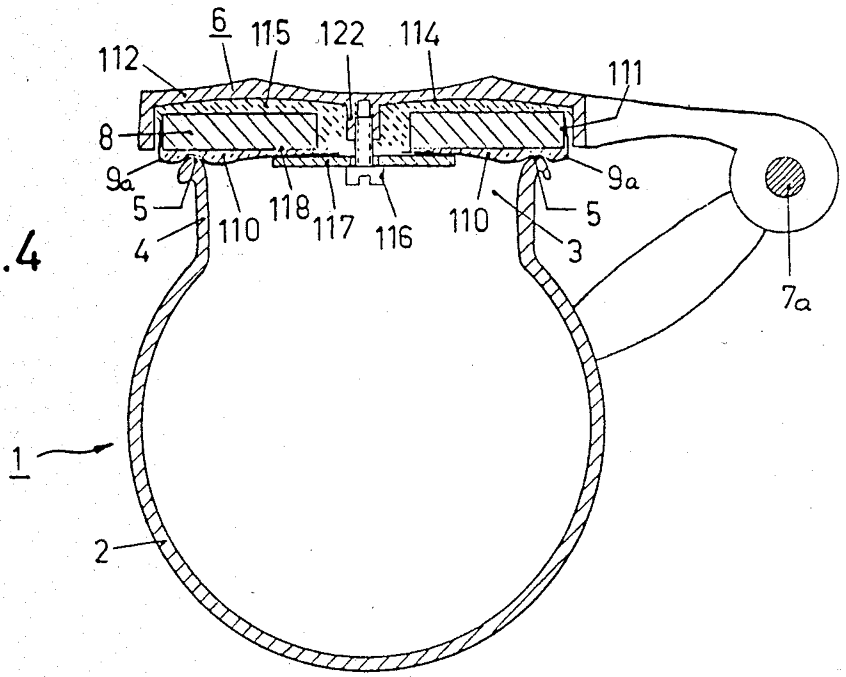
FIG. 4
FIG. 5
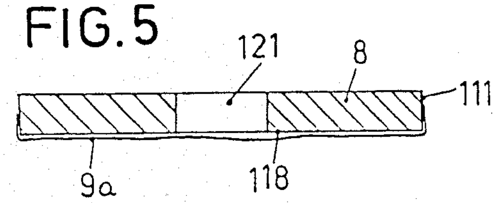
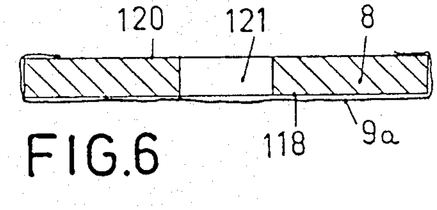
FIG. 6
FIG. 7
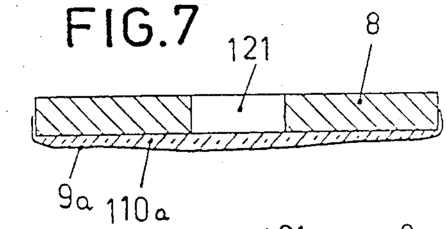
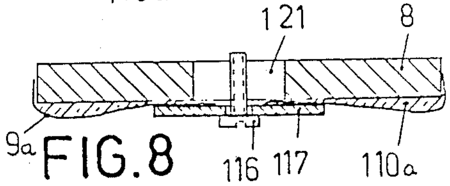
FIG. 8
FIG. 9
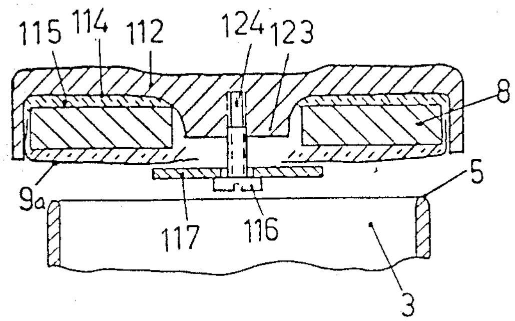

WIND INSTRUMENT AND PROCESS OF MAKING SAME

BACKGROUND OF THE INVENTION

The invention relates to a process for the manufacture of a wind instrument which, for varying the pitch, is provided with keys with which the pitch-determining holes are selectively closeable, a plastic compound solidifiable to form a nonrigid elastic plastic being brought into these keys so as to form seal inlays which are applied against the rim of these holes when the keys are in their closed position. Examples of wind instruments of the aforesaid type are the transverse flute, the saxophone, the clarinet, the oboe, the bassoon and the piccolo.

Usually used as seal inlays in these wind instruments are felt disks which are provided with a covering of gut. This construction of the seals provided on the keys requires a great deal of specialized knowledge and skill for its installation, and the installation of these known seals is associated with great effort. Some of the reasons for this are that the rims of the holes to be closed on the wind instruments are not exactly flat, that the keys are eccentrically supported and that the bottom face of the keys usually has irregularities. On the other hand, however, a tight closing of the keys is necessary for a musically satisfactory operation of the instruments. To meet this requirement, the usual procedure heretofore has been that, after a prior prelevelling of the key bottom, the seal side of the seal inlay is fitted to the shape of the hole rim by means of a thin shim which is laid between the seal inlay and the key bottom and is made of, for example, paper. It is clear that this is a very complicated task requiring a very sensitive "feel" and that consequently the installation of seal inlays by this known technique requires great effort. Moreover, the durability of these known seal inlays is relatively low, so that with a frequently played instrument it is necessary to replace the seal inlays at intervals of approximately one or two years.

The use of prefabricated seal inlays made of elastomeric material (U.S. Pat. No. 4,114,500) is also unable adequately to overcome the above-mentioned difficulties which result from the irregular shape of the holes that are to be closed with the keys.

Also known is a process of the above-mentioned type which provides for filling a liquid or paste-like plastic compound into the keys and solidifying it by means of a hardener, thereby pressing the rims of the holes into the plastic compound. Problems then arise with respect to the shape of the seal inlays produced in such a manner in the keys and with respect to the position which the keys assume when they are closed, since this position too is established in an inadequately determined manner when the rims of the holes are pressed into the plastic compound in the mentioned way. But the shape of the seal inlays affects the sound of the instrument, and the position which the keys assume when they are closed affects the playing characteristics of the instrument.

SUMMARY OF THE INVENTION

A goal of the present invention is to create a process of the above-mentioned type in which a sealing of the keys fully meeting the sound requirements and the playing requirements can be achieved in a simple manner, there also to be a possibility to convert instruments in which the keys are equipped with the heretofore common seal inlays in the manner according to the invention.

A process of the above-mentioned type according to the invention is characterized by the fact that the key filled with the plastic compound is braced in the position corresponding to its closed position in the finished instrument, the rim of the hole to be closed with the key is pressed into the plastic compound, and the brace holding the key is removed after the plastic compound is solidified.

The goal indicated above can be achieved well by this process. An exact, tight application of the keys onto the instrument holes to be closed can thus be achieved in a simple manner with relatively little effort, an exact positioning of the keys in the closed position being maintained. This is advantageous for the playability of the instrument. Silicone rubber, which provides a largely constant elastic resiliency over long periods of time, can be used advantageously as the plastic material. However, there are also other plastics that solidify to form a nonrigid elastic body that are well suited for the formation of the seal inlay, e.g., polyurethane elastomers.

One provides advantageously for the use of a plastic compound that is self-solidifying at ambient temperature, so that no additional measures are necessary to bring about the solidification of the plastic compound. But one can also use a plastic compound set for solidification at a temperature above ambient temperature, and warm the keys and/or the hole zones of the instrument in order to solidify the plastic compound after the application of the keys onto the holes assigned to them. Such a warming can be produced, for example, by supplying warm air.

An advantageous embodiment of this process, which in a simple manner makes it possible to achieve the flat shape of the seal-inlay zone lying within the rim of the hole to be closed, which is advantageous for sound-related reasons, and also simplifies the manipulation during the forming of the seal inlay, is characterized by the fact that into the hole to be closed by the key, before the key is swung into the closed position, there is inserted a packing which fills this hole and which is set back in the rim zone of the hole relative to the rim itself. It is favorable if a packing provided with a discharge hole is inserted into the hole to be closed by the key; this largely precludes undesirable forces during the closing of the key and during the molding of the hole rim. From the standpoint of the forming of the seal inlay, it is further advantageous if the plastic compound provided for the forming of the seal inlay is filled in in an amount exceeding the volume of the space delimited by the key in its closed position and the hole filled with the packing.

In order to obtain a clean lateral rim of the seal inlay, it is favorable if the key is braced in a position in which in the course of the key's motion the plane passing through the key rim has not yet reached the plane passing through the hole rim, and, before the key is swung into the closed position, a border which surrounds the hole rim in the closed position of the key and joins to the key rim and raises it is applied to the outer face of the hole rim or to the key and is removed again after the solidification of the plastic compound.

Another process of the above-mentioned type according to the invention is characterized by the fact that into the keys are inserted disks which are provided on their front with a flexible covering in the form of an elastomeric plastic or rubber foil on a thin flexible fabric or in the form of a nonwoven fabric or a gut skin, the plastic compound which is solidifiable to form a nonrigid elastic plastic being brought into the space between the disk and the covering before or after the insertion of these disks into the keys, and that then the keys are applied to the holes and the plastic compound is solidified. The above-cited goal, which is the basis of the invention, can be well met by this process too. The solidifiable plastic compound between the disk and the covering provided on it results in a good molding of the rim of the hole to be closed; the flexible covering together with the plastic compound enclosed by it also acts as a bracing of the key during the molding period, and thus a good positioning of the closed position of the keys can be achieved in a simple manner.

A small thickness of the flexible covering, e.g., a thickness of less than 0.1 mm, yields in many cases a good fit of the shape of the nonrigid elastic pad layer to the shape of the rim of the hole to be closed by the key upon solidification of the material of the pad layer and an exact closing of the key with a small application force. Coming into consideration is, for example, a foil made of synthetic rubber with a thickness of ca. 0.005 mm. With sufficiently compliant foil materials, however, one can also choose larger thicknesses of, for example, 0.4 mm. When fabrics are used to form the flexible covering, examples of fabrics that come into consideration are those made of polyamide, synthetic silk or natural silk. Such fabrics preferably are impregnated so as to obtain a sealtight and smooth seating at the rim of the hole to be closed.

Coming into consideration preferably here too for the plastic compound solidifying to form a nonrigid elastic plastic is silicone rubber, but also other plastic masses such as, for example, polyurethane or appropriately nonrigid PVC.

In the interest of good sealtightness and movement characteristics when the instrument is being played, it is advantageous if one provides for the nonrigid elastic pad layer to have a Shore hardness of between 20 and 50. The disk is advantageously made harder than the nonrigid elastic pad layer. Also advantageous for achieving good sealtightness and movement characteristics is a most uniform possible thickness of the pad layer in the circumferential direction of the disk. For this it is advantageous if the disk has an annular groove which follows the rim of the hole against which the key in question is applied and which is filled with the material of the pad layer. By means of this construction of the disk, an accumulation of the compound forming the pad layer lies in an annular zone which follows the rim to be formed on the hole to be closed, a compound which also is prevented by the groove walls from running away laterally, so that during the forming of the rim of the hole, even in unfavorable cases there is no pressing away of the plastic compound, and thus a uniform seal is formed over the entire circumference.

An advantageous embodiment of this process, which has the advantage of simple manipulation, is characterized by the fact that after gluing or welding of the flexible covering with the front rim of the disk or the circumferential face of the disk, the plastic compound is injected in liquid or paste state through a small hole in the covering into the space between the disk and the foil. Here one provides advantageously for the use of a plastic compound which is self-solidifying at ambient temperature, so that no additional measures are necessary to bring about the solidification of the plastic compound.

But one can also use a plastic compound that is hardenable by the effect of radiation and initiate the solidification after the finished installation of the disks into the keys by supplying radiation onto the seal side of the opened keys, whereupon the keys are applied to the holes and the plastic compound is allowed to solidify. This has the advantage that the plastic compound can be brought into the space between the disk and the covering during a prefabrication of the disk. The manipulation with a liquid or pasty plastic compound during the equipping of the instrument with new key-seals is then unnecessary, and one need only insert the prefabricated seal disks, covered with a flexible covering and filled with a hardenable plastic compound, into the keys. The plastic compound can be so set that the hardening process initiated by radiation continues to run independently; this independent continued running of the solidification process can be assisted, if necessary, by slight warming. But one can also use a plastic compound set for solidification at a temperature above the ambient temperature, and warm the keys and/or the hole zones of the instrument after the application of the keys onto the holes assigned to them in order to solidify the plastic compound. Such a warming can be brought about, for example, by a supply of warm air. The setting of the plastic compound can also be done in such a way that a relatively long storage time can be achieved at refrigerator or ambient temperature for the seals filled with the liquid or pasty plastic compound.

The invention relates also to a disk for the implementation of a process according to the invention with the characteristic that the disk is made of compliant plastic or rubber and is covered on its front with a flexible covering in the form of a nonrigid plastic or rubber foil or a thin flexible fabric or nonwoven fabric or a gut skin which is glued or welded to the disk on its front rim and/or on its circumferential face and/or on its back. A preferred refinement of this disk is characterized by the fact that a liquid or pasty plastic compound which is stable at ambient temperature and which is solidifiable by the effect of heat or radiation is brought into the space between the disk and the foil.

The invention also relates further to a wind instrument which, for varying the pitch, is provided with keys with which the pitch-determining holes are selectively closeable, these keys being provided with compliant seal-inlays which are applied to the rim of these holes, and which consist of a disk provided with a flexible covering. Here it is provided according to the invention that between the flexible covering and the disk there is provided a nonrigid elastic pad layer made of plastic hardened in situ, that the flexible covering is applied snugly to the nonrigid elastic pad layer and is made of a nonrigid plastic foil or of a foil of synthetic or natural rubber or of a thin flexible fabric or nonwoven fabric or of a gut skin, that the disk is preferably made of compliant plastic or rubber, and that the disk is glued or welded to the foil on its front rim and/or on its circumferential face and/or on its side facing away from the pad layer. An exact, sealtight application of the keys onto the instrument holes to be closed is achieved here owing to the fact that the plastic forming the pad layer is solidified in situ, i.e., consists of a plastic compound which is brought in under the flexible covering and upon solidification has taken the shape of the rim of the hole to be closed.

BRIEF DESCRIPTION OF THE INVENTION

The invention will now be explained further with reference to examples which are illustrated diagrammatically in the drawing in which:

FIG. 4 shows, in cross section, the zone of a hole of a transverse flute or of a saxophone which is closeable with a key, there being inserted into the key a disk which bears a flexible covering which covers a nonrigid elastic plastic on the front of the disk;

FIG. 5 and FIG. 6 show, likewise in cross section, two embodiments of seal disks which are not yet provided with a plastic compound;

FIGS. 7 and 8 show the installation and filling of such seal disks with plastic;

FIG. 9 shows a variant of the key depicted in FIG. 4, likewise in cross section;

DESCRIPTION OF THE PREFERRED EMBODIMENTS

Figure 1:
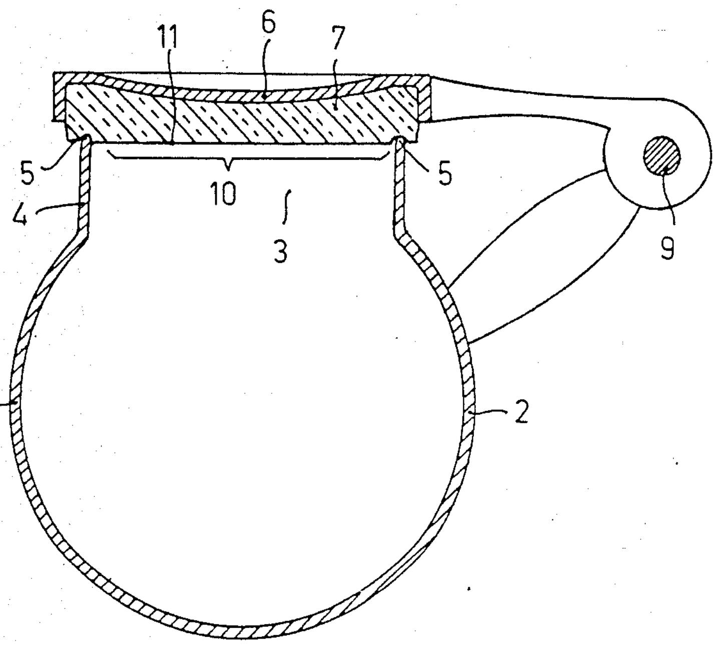
FIG. 1 shows an embodiment in cross section of a wind instrument manufactured by a process according to the invention.

In FIG. 1, the zone of a hole of a wind instrument 1 closeable by a key is depicted in cross section. The hole 3 provided on the tube 2 of the instrument is surrounded by a collar 4 which is formed on or soldered onto the tube 2. The wind instrument has several such holes 3, which are alternately coverable or closeable with keys to vary the pitch of the instrument. The key 6 assigned to the hole 3 is provided with a compliant disk-like seal inlay 7 which is applied against the rim 5 of the hole 3 in order to cover it. The seal inlay 7 is made of a nonrigid elastic plastic having a Shore hardness which lies between 20 and 50. Silicone rubber is especially well suited as material for the seal inlay 7.

In the zone 10 lying above the hole 3 to be covered, the surface 11 of the seal inlay 7 is flat and reaches only slightly under the rim 5 of the hole 3 when the key 6 is closed. This is advantageous for the sound characteristics of the instrument.

The seal inlay 7 is formed from a plastic solidified in situ, and there is thereby ensured an exact application of this seal inlay against the rim 5 of the hole 3 over the entire extent of this rim, and, when the key 6 which is swingably supported on a hinge 9 braced on the tube 2 is opened, the key 6 and its seal inlay 7 are lifted off the rim 5, and, vice versa, when the key is closed, the key is applied simultaneously over the entire circumferential extent of the rim 5.

Figure 2:
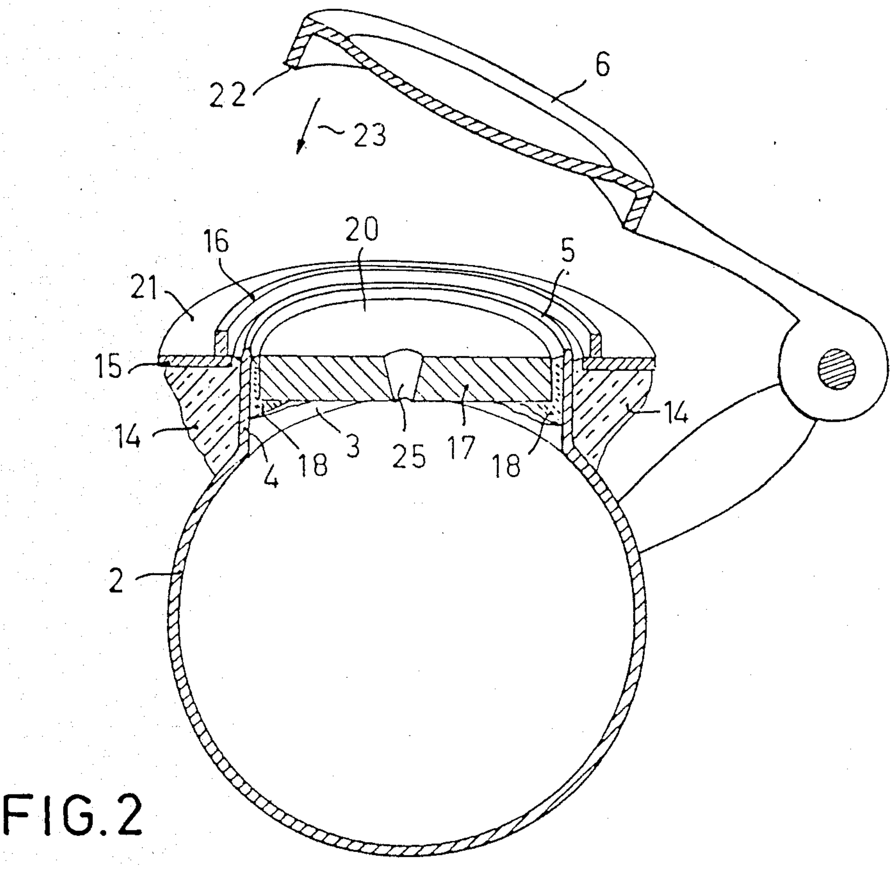
FIG. 2 shows a first stage of an embodiment of the process according to the invention by means of a projection and sectional depiction of a wind instrument corresponding to FIG. 1.

Within the scope of the process according to the invention for the manufacture of a wind instrument whose keys are provided as mentioned above with seal inlays made of a nonrigid elastic plastic solidified in situ, it is provided that a liquid or pasty plastic compound solidifiable to form a nonrigid elastic plastic is filled into the space between each key, in which no seal inlay is yet located, and the rim of the hole to be covered by this key, and that the key is swung into the position corresponding to its closed position in the finished instrument and is braced in this position, and that the plastic compound is solidified and then the brace holding the key is removed. To form the brace for the key, one can advantageously, as depicted in FIG. 2, apply all around the hole 3 and around the collar 4 surrounding the hole an adhesive such as a plastic compound 14 onto which is then set a suitable support which braces the key 6 in a position corresponding to the closed position in the finished instrument. Wax or putty, for example, is well suited as plastic compound. To form the support for the key 6, one advantageously sets onto the plastic compound 14 a support disk 15 and arranges on the latter a border ring 16 against which the key 6 is applied. By means of the support disk 15 and the border ring 16, one also obtains in this manner an outer termination of the space between the key 6 and the rim 5 of the hole 3, which is filled with the plastic compound provided for the forming of the seal inlay.

In order to exactly limit the mentioned space in the zone of the hole 3 too, and in order to obtain a flat surface of the seal inlay to be formed in the zone of the hole 3, one advantageously, inserts into the hole 3 to be closed by the key 6 a packing disk 17, as depicted in FIG. 2, and fixes it in the hole 3 with an adhesive such as a plastic compound 18; wax or putty, for example, can be used for this too. One chooses the position of the packing disk 17 so that its end face 20 is set back by a little bit, e.g., 1 mm, from the rim 5 of the hole. One also sets the support disk 15 onto the plastic compound 14 in such a way that the rim 5 of the hole 3 projects somewhat, e.g., 1 mm, beyond the end face 21 of the support disk 15. The support disk 15 and the border ring 16 are suitably connected to each other so as to facilitate the manipulation during the forming of the seal inlay in the key 6. Such a connection can be made with, for example, glue. The annular border 16 is positioned on the support disk 15 in such a manner that this border 16 axially prolongs the key rim 22 when the key is in its closed position, and, by swinging the key into its closed position according to the arrow 23, the border 16 is brought into all-around contact with the key 6 and its rim 22 by appropriate deforming of the plastic compound 14. Thus, the key 6 is braced in a position in which the plane passing through the key rim 22 has not yet reached the plane passing through the rim 5 of the hole 3, so that the key assumes a position lying a bit above the rim 5.

Figure 3:
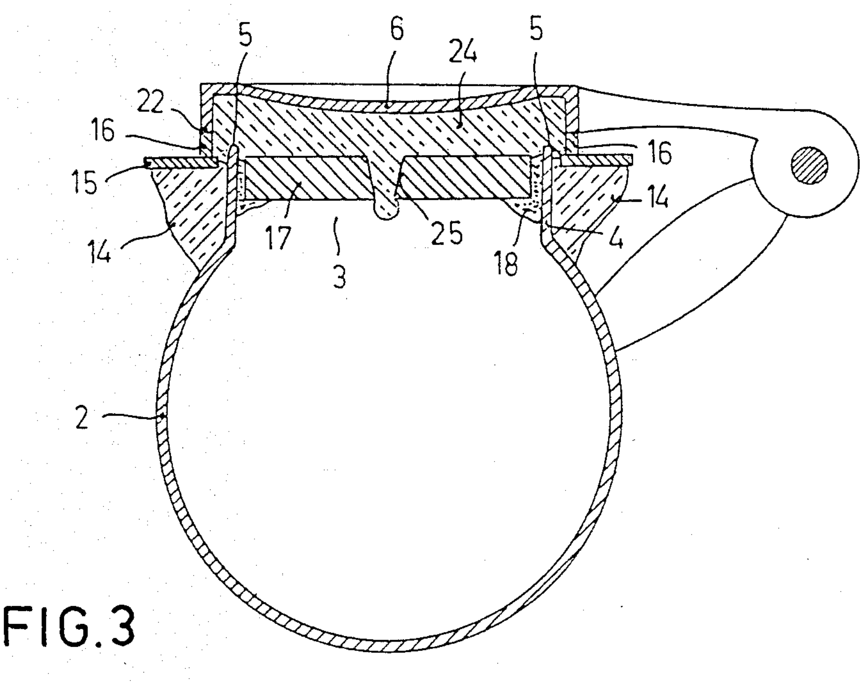
FIG. 3 shows a second stage of this process in a sectional depiction corresponding to FIG. 2.

Then the key 6 is opened again and the plastic compound 24 provided for the forming of the seal inlay is brought either into the key 6 or into the zone surrounded by the packing disk 17 and the border 16, and then the key 6 is closed again, whereby the rim 5 of the hole 3 to be closed by the key 6 is pressed into the plastic compound 24, and this rim is molded in the plastic compound 24. This stage of the process is depicted in FIG. 3.

Then the plastic compound for forming the seal inlay 7 is solidified.

The plastic compound provided for forming the seal inlay 7 is preferably introduced in excess relative to the volume delimited by the key 6 in its closed position and the hole 3 filled with the packing disk 17. This achieves, in a simple manner, a complete filling of this space and especially of the zone surrounding the rim 5 of the hole 3. In order to avoid forces which might detrimentally shift the support disk 15 or the packing disk 17, a packing provided with a discharge hole 25 is advantageously inserted.

After the solidification of the plastic compound which forms the seal inlay, the key is opened and the packing disk 17 is removed from the hole 3, and the support disk 15 and the plastic compound 14 are removed. If the border ring 16 was only lightly fixed on the support disk 15, it remains on the rim of the seal inlay 7 when the key is opened, and is then removed from the rim of the seal inlay. The border ring 16 yields, without further rework, a clean shape of the rim of the seal inlay.

After the key 6 is opened, a pin-like attachment remains on the seal inlay 7 from the discharge hole 25, which can be cut off without difficulty.

Instead of an annular border 16, one can also provide a simple brace for the key 6, whereby between the support disk 15 and the rim 22 of the key 6 there remains an annular gap which permits an emergence of the excess of the plastic compound provided for forming the seal inlay, without having to provide a discharge hole in the packing disk 17. But in this case there results an irregular rim of the seal inlay, which, after the the latter's hardening, must be cut away or cleaned to form a smooth edge.

The hardening of the plastic compound provided for the forming of the seal inlay 7 can be accomplished by a suitable hardener setting at ambient temperature. But, in order to obtain a longer molding time or pot life of the plastic compound, one can also choose the composition of that plastic compound so that it does not exhibit a sufficiently fast hardening behavior until an elevated temperature is reached, and then warm the key zone of the instrument appropriately after bringing in the plastic compound, which can be accomplished by means of hot air, for example.

In the wind instrument 1 depicted in FIG. 4, which can be, for example, a transverse flute or a saxophone, the hole 3 provided on the tube 2 is surrounded by a collar 4 which is formed on the tube 2. The key 6, which is swingably supported on a hinge 7*a* braced on the tube 2, is applied against the rim 5 of the hole 3. To seal against the rim 5 of the hole 3, the key 6 is provided with a compliant seal inlay. This seal inlay consists of a disk 8 which is covered on the side facing the rim 5 with a nonrigid foil 9*a* made of plastic, synthetic rubber or natural rubber. Between the foil 9*a* and the disk 8 is provided a nonrigid pad layer 110 made of a solidified plastic. The foil 9*a* is welded or glued to the rim 111 of the disk 8. The disk 8 is advantageously made of a compliant plastic or rubber. In order to form a good application of the disk 8 in the key body 112 and compensate for irregularities of the inner face 114 of the key body, a solidified plastic compound 115 is provided between this inner face 114 and the disk 8. Therefore, plastic compound 115 serves as a smoothing layer. The disk 8 covered with the foil 9*a*, which disk also bears the nonrigid elastic pad layer 110, is fastened in the key body 112 by means of a screw 116 which is screwed into a corresponding thread in the key body and which secures the disk 8 in its middle via a pressure disk 117. In this and the following examples, instead of the foil 9*a* there can also be provided a covering of the same type consisting of a thin flexible fabric or nonwoven fabric or of a gut skin. Fabric and nonwoven fabric are preferably impregnated so as to obtain a flush seating.

In its zone following the rim 5 of the hole 3, the nonrigid elastic pad layer 110 is matched to the shape of the rim 5, and the nonrigid compliant foil 9*a* follows the course of the surface of the pad layer 110 facing toward the rim 5. This shape matching of the pad layer 110 is achieved by the fact that a plastic compound capable of solidification was filled in liquid or paste state into the space between the front 118 of the disk 8 and the foil 9*a*, and that then the key 6 was brought into its closed position as depicted in FIG. 4 and in this position the plastic compound was solidified, whereby the shape of the edge 5 is exactly molded into the nonrigid elastic pad layer 110 as the plastic compound solidifies.

To produce a key seal according to FIG. 4, one starts advantageously with an elastic disk 8, as depicted in FIG. 5, which is made of elastic plastic or rubber of medium hardness. This disk is covered at least on its front 118 with a thin nonrigid flexible foil 9*a* which is glued or welded to the disk 8. The gluing or welding is preferably done on the front rim or on the circumferential face 111 of the disk 8. The glue or weld joint of the foil 9*a* with the disk 8 can also be placed on the back 120 of the disk 8, as is provided in the embodiment according to FIG. 6. One can also cover both the front 118 and the back 120 of the disk 8 with the foil 9*a*. The foil 9*a* is advantageously made of synthetic rubber or a nonrigid elastomeric plastic. Natural rubber can also be considered. The thickness of the foil 9*a* can be chosen to be, for example, less than 0.1 mm. Larger thicknesses can also be considered.

The space between the disk 8 and the foil 9*a* is then filled with the plastic compound 110*a* provided for the forming of the pad layer 110, which can be done, for example, from the back through the central hole 121 in the disk depicted in FIG. 5, or through a small hole in the foil 9*a*, and one thus obtains a disk as is depicted in FIG. 7. This disk is then inserted with the pressure disk 117 and the screw 116 into the key body 112, into which a compensating compound 115 was brought previously. The result is a configuration of the disk 8 covered with the foil 9*a* and the plastic compound 110*a* provided for the forming of the pad layer, as is depicted in FIG. 8. Here the foil 9*a* is tightly clamped at the rim of the hole 121 of the disk 8 by the pressure disk 117, so that between the disk 8 and the foil 9*a* there is formed an annular chamber in which the plastic compound 110*a* provided for the forming of the pad layer is located. When the key 6 is closed, the seal with the foil 9*a* is applied against the rim 5 of the hole 3, and the shape of the rim 5 is molded during the solidification of the plastic compound 110*a* which forms the pad layer 110, so that the shape of the seal matches the shape of the rim 5 of the hole 3.

As a modification of the above-described process, one can also first fasten the disk 8 with the plastic foil 9*a* covering its front 118 in the key body 112 by means of the screw 116 and then inject the liquid or pasty plastic compound 110*a* provided for the forming of the pad layer 110 through a small hole in the foil 9*a* into the space between the disk 8 and the foil 9*a*, whereby the state depicted in FIG. 8 is obtained again.

The disk 8 is advantageously chosen to be distinctly harder and/or stiffer than the nonrigid elastic pad layer 110 in the solidified state. A Shore hardness of between 20 and 50 is advantageously chosen for the nonrigid elastic pad layer 110.

In the embodiment depicted in FIG. 4, in which the inner face of the key body 112 has the shape of an annular basin in whose middle a relatively thin threaded sleeve 122 is arranged, one advantageously inserts the disk 8 as long as the compensating compound 115 is still nonrigidly-plastically compliant. The result is a filling of the hole 121 of the disk 8 with the compensating compound. In the variant of a key 6 depicted in FIG. 9, the inner face 114 of the key body 112 is essentially flat and has a cylindrical middle part 123 in which a thread 124 is provided for accepting the screw 116. In this embodiment, the compensating compound 115 can advantageously be hardened before the insertion of the disk 8, whereby an essentially flat application face for the disk 8 is formed, and only then is the disk 8 inserted and fastened with the screw 116 and the pressure disk 117. This is advantageous for a simple replacement of the disk 8. If desired, an adhesive fastening of the disk 8 in the key body 112 can also be provided in addition to the screw fastening.

Such a gluing of the seal inlay into the key body is also done in those cases in which the key 6 has only a simple depression provided for the insertion of the seal inlay, but has no provisions for a screw fastening, as is generally the case for the small keys of transverse flutes and saxophones and for the keys of clarinets, oboes, bassoons and piccolos.

Figure 10:
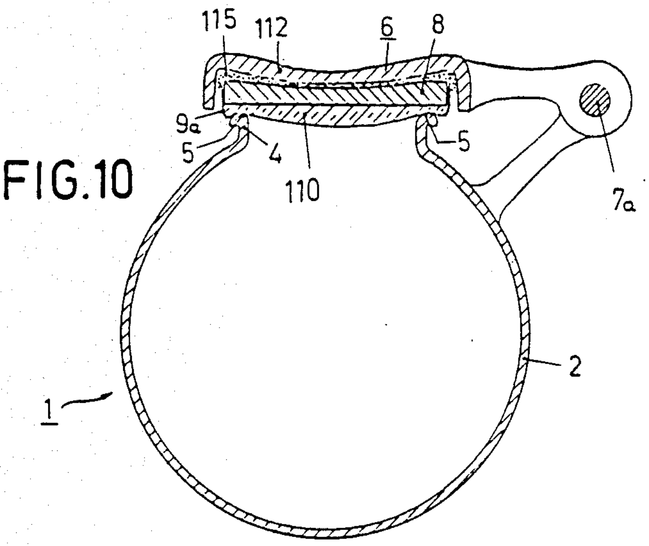
FIG. 10 shows, in cross section, the zone of a small hole of a transverse flute or of a saxophone which is closeable with a key.

As is shown in FIG. 10 which depicts the zone of the small hole 3 of a transverse flute closeable with a key 6, in analogy to the embodiment according to FIG. 4 there is inserted into the key body 112 a disk 8 which is covered on its front 118 with a nonrigid compliant foil 9*a*, a nonrigid elastic pad layer 110 being provided in the space between the disk 8 and the foil 9*a*. In analogy to what was described above in connection with FIG. 4, this pad layer is formed from a plastic compound which is solidified in situ and in so doing has molded the rim 5 of the collar 4 surrounding the hole 3, so that the seal and its pad layer 110 are exactly fitted to the shape of the rim 5. The disk 8 is glued into the key body 112, a compensating compound 115 previously having been brought into the interior of the key body 112 if necessary. The solidifying plastic compound provided for the forming of the pad layer 110 can be brought into the space between the disk 8 and the foil 9*a* through a small hole before or after the gluing of the disk 8 into the key body 112.

Figure 11:
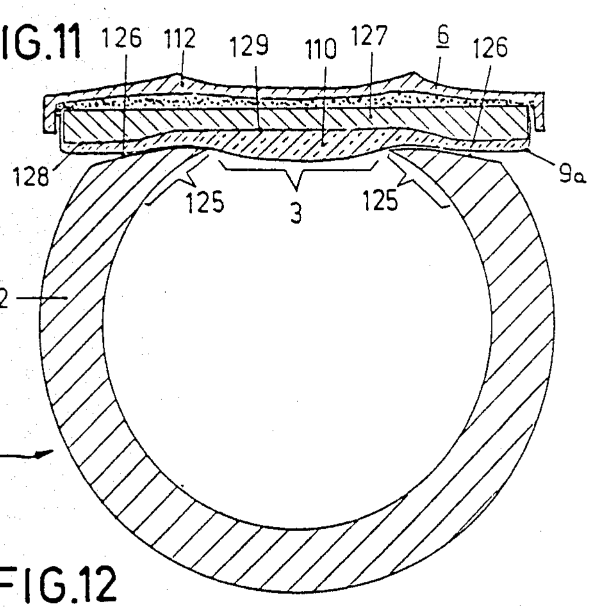
FIG. 11 shows, likewise in cross section, the zone of a hole of a woodwind instrument such as a clarinet, an oboe, a bassoon or a piccolo which is closeable with a key.

An embodiment similar to that of FIG. 10 is depicted in FIG. 11. In this case, the hole 3 is surrounded by a bevelled zone 125 of the tube 2 of the wind instrument 1. The key 6, which is swingably supported in a manner not depicted in detail, is applied with its seal against the outer side 126 of the zone 125. The seal is formed by a disk 127, whose front 128 is covered with a covering, e.g., in the form of a nonrigid plastic or rubber foil 9*a*, and by a pad layer 110. The disk 127, which is elastically compliant but harder than the nonrigid elastic pad layer 110, is provided in this case with a recess 129 for adapting to the shape of the outer side 126 of the zone 125. In analogy to the embodiment according to FIG. 10, the disk 127 is glued into the key body 112. The pad layer 110 is constructed in analogy to what was described above in connection with FIGS. 4 to 10.

Figure 12:
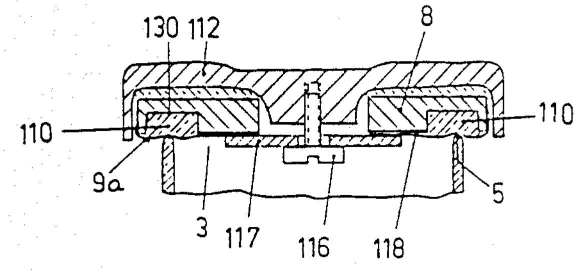
FIG. 12 shows, in cross section, another variant of the key depicted in FIG. 4.

The variant depicted in FIG. 12 has as an essential feature a disk 8 on whose front 118 is provided an annular groove 130 which is filled by the nonrigid elastic pad layer 110. The fastening of the disk 8 in the key body 112 is accomplished with a screw 116 and a pressure disk 117 in a manner similar to the variant according to FIG. 9. The pressure that is generated also closes off the space between the disk 8 and the covering 9*a* radially to the inside. Radially to the outside, this space is closed off by gluing of the covering 9*a* to the rim of the disk 8. In this case, too, the disk 8 can be elastically compliant. However, owing to the larger thickness of the pad layer 110 in this case, the disk 8 can also be made of a harder material such as hard plastic or metal. The larger thickness of the pad layer 110 also facilitates the adaptation to the shape of the rim 5 of the hole 3. In this case too, the solidifying plastic compound provided for the forming of the pad layer 110 can be brought into the space between the disk 8 and the covering 9*a* and/or into the annular groove 130 before or after the insertion of the disk 8 into the key body 112.

We claim:

1. A process for the manufacture of a wind instrument that has at least one pitch-determining hole and key for selectively closing the hole, comprising:

(a) interposing a plastic compound that is solidifiable to form a nonrigid elastic plastic between the key and the hole;

(b) bracing the key in a position substantially corresponding to its closed position; and (c) removing the brace after the plastic compound has solidified into the elastic plastic, whereby the elastic plastic forms a seal inlay within the key which is applied against the rim of the hole when the key is in the closed position.

2. A process according to claim 1, wherein the hole has a rim, further comprising inserting a packing into said hole to thereby fill the hole, said packing being set back in the rim zone of the hole relative to the rim, prior to bracing the key.

3. A process according to claim 2, wherein the packing is provided with a discharge hole.

4. A process according to claim 2, wherein the plastic compound provided for the forming of the seal inlay is filled in an amount exceeding the volume of the space delimited by the key in its closed position and the hole filled with the packing.

5. A process according to 1, wherein each of the key and the hole has a rim, and the key is braced in a position wherein the plane of the key rim is offset from the plane of the hole rim.

6. A process according to claim 5, wherein said bracing step comprises applying a border to either (a) the outer face of the hole rim or (b) the key, said border surrounding the hole rim and joining to the key rim.

7. A process according to claim 6, further comprising applying a second plastic compound around the hole, leaving the hole rim projecting freely, and pressing a support disk onto the second plastic compound, said support disk in turn supporting the border and establishing the closed position of the key.

8. A process according to claim 7, wherein the support disk and the border are connected to each other.

9. A process for the manufacture of a wind instrument that has at least one pitch-determining hole and a key for selectively closing the hole, comprising:

(a) inserting a disk into the key, the disk being provided on its front with a flexible covering and having a space therebetween;
(b) placing a plastic compound into the space between the disk and the flexible covering before or after the insertion of the disk into the key, the plastic compound being capable of solidifying to form a nonrigid elastic plastic;
(c) applying the key to the hole to close the hole;
(d) allowing the plastic compound to solidify, whereby the elastic plastic forms a seal inlay within the key which is applied against the rim of the hole when the key is in the closed position.

10. A process according to claim 9, wherein the flexible covering is an elastomeric plastic, rubber foil, thin flexible fabric, nonwoven fabric or gut skin.

11. A process according to claim 9, wherein the plastic compound is injected in liquid or paste state through a small hole in the covering into the space between the disk and the flexible covering.

12. A process according to claim 9, wherein the plastic compound is self-solidifying at ambient temperature.

13. A process according to claim 9, wherein the plastic compound is hardenable by the effect of radiation and the solidification is initiated after the disk is inserted into the key by supplying radiation onto the seal side of the opened key, whereupon the key is applied to the hole and the plastic compound is allowed to solidify.

14. A process according to claim 9, wherein the plastic compound solidifies at a temperature above the ambient temperature, and at least one of the key and the hole zone of the instrument is heated after the application of the key onto the hole in order to solidify the plastic compound.

15. A process according to claim 9, further comprising levelling the inner face or the key with a second plastic compound before inserting the disk.

16. A disk assembly for inserting in the key of a wind instrument manufactured according to the process of claim 9, comprising a disk made of compliant polymeric material and a flexible covering which is attached to the disk on at least one of its front rim, its circumferential face, and its back.

17. A disk assembly according to claim 16, wherein said flexible covering is an elastomeric plastic, rubber foil, thin flexible fabric, nonwoven fabric or gut skin.

18. A disk assembly according to claim 16, wherein said disk has an annular groove on its front.

19. A disk assembly according to claim 16, further comprising a liquid or pasty plastic compound which is stable at ambient temperature and which is solidifiable by the effect of heat or radiation and is brought into the space between the disk and the flexible covering.

20. A wind instrument comprising:
(a) at least one pitch-determining hole;
(b) a key for selectively closing the hole; and
(c) a seal inlay provided within the key for contacting the rim of the hole when the key closes the hole,
wherein the inlay comprises a disk provided with a flexible covering and a pad layer made of plastic that is hardened in situ between the flexible covering and the disk, and
wherein the flexible covering is attached to the disk on at least one of its front rim, its circumferential face, and on its side facing away from the pad layer.

21. A wind instrument according to claim 20, wherein the flexible covering is a nonrigid plastic foil, rubber foil thin flexible fabric, nonwoven fabric or gut skin.

22. A wind instrument according to claim 20, wherein the flexible covering of the seal inlay is an elastomeric plastic foil.

23. A wind instrument according to claim 20, wherein the nonrigid elastic pad layer is made of a silicone rubber

24. A wind instrument according to claim 20 wherein the nonrigid elastic pad layer has a Shore hardness of between 20 and 50.

25. A wind instrument according to claim 20, wherein the disk is harder than the nonrigid elastic pad layer.

26. A wind instrument according to claim 20, wherein the disk further comprises an annular groove along the rim of the hole against which the key is applied and which is filled with material of the pad layer.

27. A wind instrument according to claim 20, wherein the disk on its rim conforms approximately to the shape of the face of the hole to be closed.

* * * * *